(12) United States Patent
Yoshida et al.

(10) Patent No.: US 10,755,746 B2
(45) Date of Patent: Aug. 25, 2020

(54) REAL-TIME EDITING SYSTEM

(71) Applicant: SAKURA EIKI Co., Ltd., Tokyo (JP)

(72) Inventors: Toshiteru Yoshida, Tokyo (JP);
Teruyuki Murata, Tokyo (JP)

(73) Assignee: SAKURA EIKI CO., LTD., Tokyo (JP)

( * ) Notice: Subject to any disclaimer, the term of this patent is extended or adjusted under 35 U.S.C. 154(b) by 97 days.

(21) Appl. No.: 16/315,622

(22) PCT Filed: Jul. 5, 2016

(86) PCT No.: PCT/JP2016/069830
§ 371 (c)(1),
(2) Date: Jan. 4, 2019

(87) PCT Pub. No.: WO2018/008076
PCT Pub. Date: Jan. 11, 2018

(65) Prior Publication Data
US 2019/0251999 A1    Aug. 15, 2019

(51) Int. Cl.
| | | |
|---|---|---|
| G11B 27/031 | (2006.01) | |
| G11B 27/02 | (2006.01) | |
| H04N 5/91 | (2006.01) | |
| H04N 19/00 | (2014.01) | |
| H04N 19/44 | (2014.01) | |
| G11B 20/10 | (2006.01) | |
| H04B 10/275 | (2013.01) | |
| H04N 9/87 | (2006.01) | |

(52) U.S. Cl.
CPC ...... *G11B 27/031* (2013.01); *G11B 20/10527* (2013.01); *G11B 27/02* (2013.01); *H04B 10/275* (2013.01); *H04N 5/91* (2013.01); *H04N 9/87* (2013.01); *H04N 19/00* (2013.01); *H04N 19/44* (2014.11)

(58) Field of Classification Search
None
See application file for complete search history.

(56) References Cited

U.S. PATENT DOCUMENTS

| | | | |
|---|---|---|---|
| 9,307,260 B2* | 4/2016 | Yoshimatsu | .......... H04N 19/44 |
| 9,549,221 B2* | 1/2017 | Into | .................... H04N 21/4854 |
| 2010/0074596 A1 | 3/2010 | Satoh et al. | |
| 2018/0276130 A1* | 9/2018 | Choi | ................ H04N 21/44012 |

FOREIGN PATENT DOCUMENTS

| | | |
|---|---|---|
| JP | 2000295616 | 10/2000 |
| JP | 2012147288 | 8/2012 |
| JP | 2013141065 | 7/2013 |

OTHER PUBLICATIONS

International Search Report for PCT/JP2016/069830, dated Sep. 6, 2016.

* cited by examiner

*Primary Examiner* — Heather R Jones
(74) *Attorney, Agent, or Firm* — Steven M. Greenberg, Esq.; Shutts & Bowen LLP

(57) ABSTRACT

A real-time editing system includes: a control device configured to create a rendering job containing a decode command to a decoder and a render command to a renderer; the renderer configured to create and transmit a decode job to the decoder, based on the rendering job, and render a material video decoded by the decoder; and the decoder configured to decode a compressed material image based on the decode job, and transmit the material image to the renderer.

3 Claims, 10 Drawing Sheets

FIG. 2
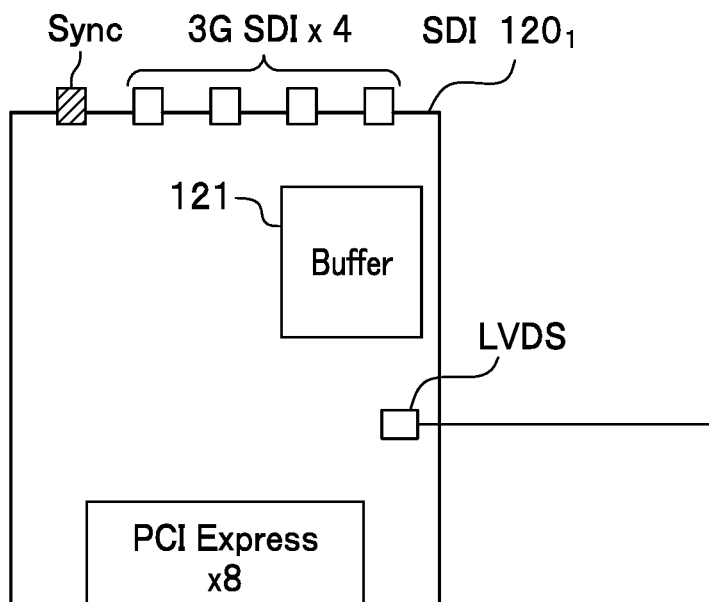
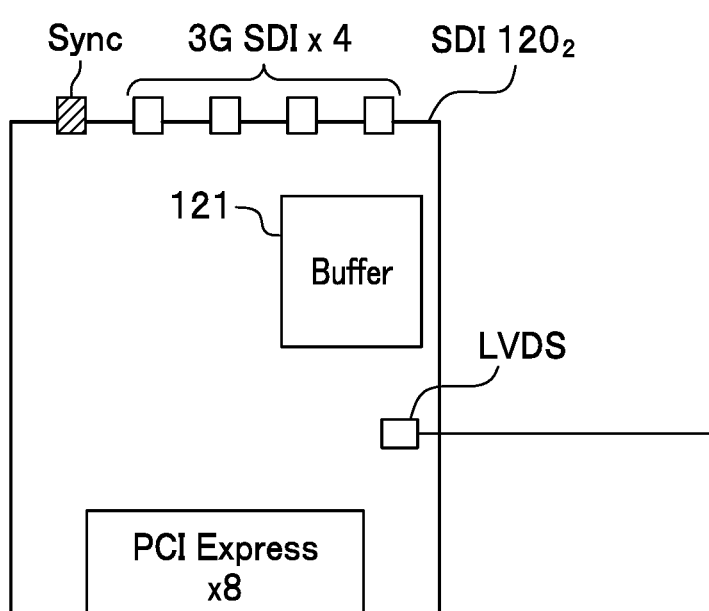

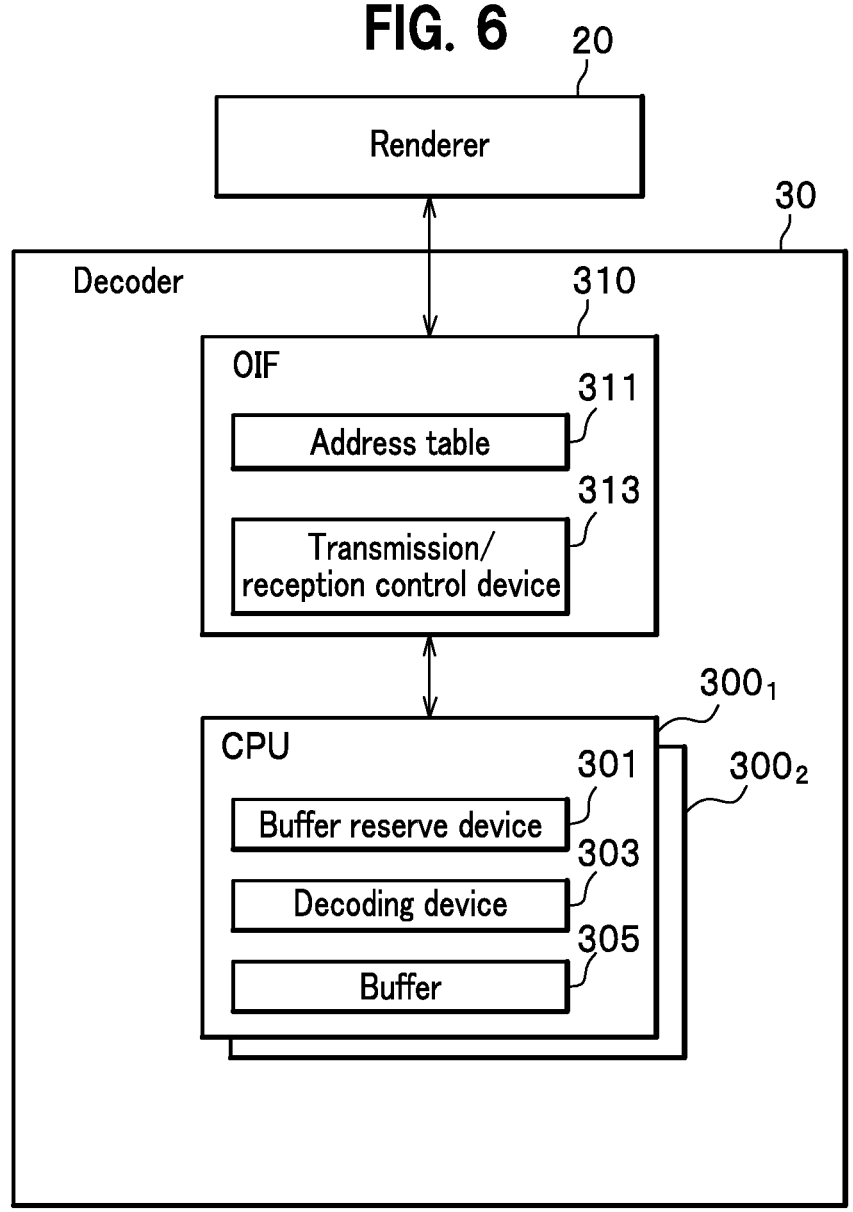

REAL-TIME EDITING SYSTEM

CROSS REFERENCE TO RELATED APPLICATION

This application is a National Stage Application of PCT/JP2016/069830, filed on Jul. 5, 2016, and which application is incorporated herein by reference. To the extent appropriate, a claim of priority is made to the above disclosed application.

TECHNICAL FIELD

The present invention relates to a real-time editing system which performs editing of an ultra-high-resolution video.

BACKGROUND ART

Editing devices which perform various editing tasks such as decoding and rendering of material videos have been proposed (see, for example, Patent Document 1). The invention described in Patent Document 1 discloses that a single unit of a workstation performs editing tasks.

Videos at ultra-high resolution with high frame rate have recently been achieved, such as 8K60p. The term 8K60p means 60 frame images per second at a resolution of 7680×4320 pixels.

RELATED ART DOCUMENT

Patent Document

Patent Document 1: Japanese Laid-Open Patent Application, Publication No. 2000-295616

SUMMARY OF THE INVENTION

Problem to be Solved by the Invention

Conventional editing devices have, however, a problem that it is difficult to edit an ultra-high-resolution video with an enormous amount of data on a real time basis, because throughput of a CPU (Central Processing Unit) thereof or the like is insufficient.

In the light of the problem described above, the present invention has been made in an attempt to provide a real-time editing system which can perform editing of an ultra-high-resolution video in real time.

Means for Solving the Problem

In the light of the problem described above, a real-time editing system of an ultra-high-resolution video has a configuration including: a plurality of decoders, each of which is configured to decode a compressed ultra-high-resolution material video; a plurality of renderers, each of which is configured to render the material video decoded by the decoder; and a single unit of controller configured to control the decoder and the renderer.

In the configuration described above, the controller includes: a processing system determination device configured to determine which processing system processes which frame image of the ultra-high-resolution video, the processing system being sequentially processing the frame images; and a rendering job create device configured to create, for each of the frame images, a rendering job containing a decode command which instructs the decoder to decode the compressed material video and a render command which instructs the renderer to render the decoded material video, and transmit the created rendering job to the renderer.

The renderer includes: a decode job create device configured to create a decode job containing the decode command in the rendering job received from the controller, and transmit the created decode job to the decoder; and a render device configured to render the material video decoded by the decoder, based on the rendering job received from the controller, and thereby create an ultra-high-resolution rendered video, the number of units of the render device being half that of the processing systems.

The decoder includes a decoding device configured to decode the compressed material video, based on the decode job received from the renderer.

The processing system determination device of the controller is configured to create the ultra-high-resolution video in which the rendered video created by the renderer is arranged in order corresponding to the processing systems.

That is, the real-time editing system divides a processing in three layers, namely, a controller, a renderer, and a decoder (processing division). The real-time editing system also performs a division processing of frame images of an ultra-high-resolution video for each of processing systems (time division). The real-time editing system further performs a division processing of material videos in each of the processing systems, by a plurality of units of the decoders (space division).

Advantageous Effects of the Invention

The present invention has advantageous effects as described below.

The real-time editing system of the present invention has a throughput increased by the processing division, time division, and space division and can thus perform editing of even an ultra-high-resolution video with an enormous amount of data on a real time basis.

BRIEF DESCRIPTION OF THE DRAWINGS

FIG. 2 is an explanatory diagram illustrating an SDI of FIG. 1 according to the embodiment.

FIG. 6 is a block diagram illustrating a configuration of a decoder of FIG. 1 according to the embodiment.

EMBODIMENT FOR CARRYING OUT THE INVENTION

[Overall Configuration of Real-Time Editing System]

An embodiment of the present invention is described in detail with reference to related drawings where appropriate.

An overall configuration of a real-time editing system 1 is described with reference to FIG. 1.

Figure 1:
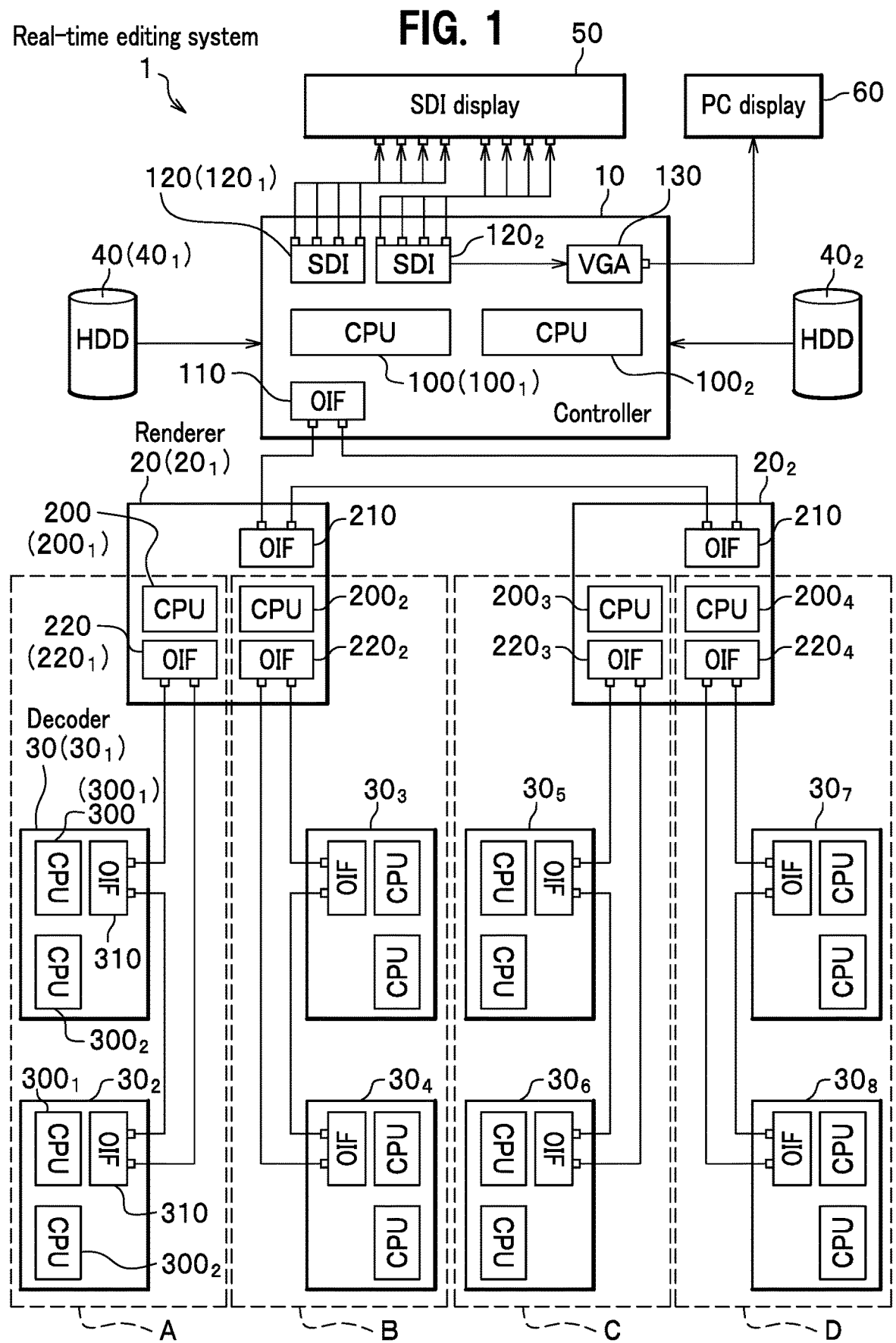
FIG. 1 is a block diagram illustrating an overall configuration of a real-time editing system according to an embodiment of the present invention.

As illustrated in FIG. 1, the real-time editing system 1: edits an ultra-high-resolution video on a real-time basis; and includes a controller 10, a renderer 20, a decoder 30, a HDD (Hard Disk Drive) 40, a SDI (Serial Digital Interface) display 50, and a PC (Personal Computer) display 60.

The ultra-high-resolution video used herein means a video at a super-high resolution such as 8K60p with high frame rates. In this embodiment, description is made assuming that the ultra-high-resolution video is an 8K60p video, that is, a video at a resolution of 7680×4320 pixels with a frame rate of 60 fps (Frames Per Second).

The real-time editing system 1 has processing systems by the number based on a divisor of frame rates of an ultra-high-resolution video of interest. The processing system: herein means a unit by which each of frame images of the ultra-high-resolution video is sequentially processed; and includes a combination of two decoders 30 and one CPU 200 disposed in the renderer 20.

In this embodiment, an ultra-high-resolution video has the frame rate of 60 fps, based on divisor of which four units of the processing systems are provided (each of which is specifically referred to as processing systems A to D hereinafter). This means that in the real-time editing system 1, each of the processing systems A to D processes 15 frame images per second, totaling 60.

The real-time editing system 1 includes: a single unit of the controller 10; the renderer 20 in the number of units half that of the processing systems; the decoders 30 in the number of units twice that of the processing systems; and a HDD 40 in the number of units half that of the processing systems. That is, in the real-time editing system 1, since one unit of the CPU 200 in the renderer 20 is allocated for each of the processing systems, the renderer 20 in the number of units half that of the processing systems is provided. In this embodiment, the real-time editing system 1 has four processing systems, and thus, two units of the renderers 20 ($20_1$, $20_2$), eight units of the decoders 30 ($30_1$-$30_8$), and two units of the HDDs 40 ($40_1$, $40_2$) are provided.

The controller 10 controls the renderer 20 and the decoder 30. The controller 10: arranges a rendered video rendered by the renderer 20 in a prescribed order; thereby creates an ultra-high-resolution video; and outputs the created ultra-high-resolution video to a SDI display 50. The controller 10 also: creates a preview video which is made by reducing the ultra-high-resolution video; and outputs the created preview video to a PC display 60.

In this embodiment, the controller 10 includes: two units of the CPUs 100: an optical IF (Interface) (OIF) 110; two units of SDIs 120; and a VGA (Video Graphics Array) 130.

The CPU 100 (which may also be specifically referred to as $100_1$, $100_2$) is a central processing unit that performs various types of operations required for the controller 10. The CPU 100 is realized by, for example, a dual CPU.

The optical IF 110 is a network interface connected to an optical ring communication network. The optical IF 110 is equipped with, for example, two units of 40-Gbps optical modules and is connected to the CPU 100 via PCI Express (Gen3)×8 lanes.

The SDI 120 ($120_1$, $120_2$) is a video output board that outputs an ultra-high-resolution video to the SDI display 50. In this embodiment, as illustrated in FIG. 2, the SDI 120 has a Sync terminal which inputs an external synchronization signal, and four SDI terminals. The SDI 120: is equipped with a DDR3 SDRAM (Double Data Rate3 Synchronous Dynamic Random Access Memory) as a buffer 121; and is connected to the CPU 100 via the PCI Express (Gen3)×8 lanes. The SDI 120 is also equipped with a LVDS (Low Voltage Differential Signaling) terminal so as to synchronize the SDI $120_1$ as a master with the SDI $120_2$ as a slave.

The VGA 130 is a generally available VGA board that outputs a preview video to the PC display 60.

The renderer 20 renders a material video decoded by the decoder 30, to thereby create an ultra-high-resolution rendered video. The renderer 20 then writes the created rendered video in the controller 10 using RDMA (Remote Direct Memory Access).

The renderer 20 used herein includes two units of the CPUs 200, the optical IF 210, and two units of the optical IFs 220.

Note that in the renderer 20, the two CPUs 200 belong to respective processing systems different from each other, and thus perform respective operations separately.

Hardware configurations of the CPU 200 and the optical IFs 210, 220 are similar to those of the CPU 100 and the optical IF 110, respectively, and description thereof is thus omitted hereafter.

In this embodiment, in the renderer $20_1$ as a first unit, a combination of the CPU $200_1$ as a first unit and an optical IF $220_1$ corresponds to the processing system A. A combination of the CPU $200_2$ as a second unit and an optical IF $220_2$ corresponds to the processing system B. In the renderer $20_2$ as a second unit, a combination of the CPU $200_3$ as a first unit and an optical IF $220_3$ corresponds to the processing system C. And, a combination of the CPU $200_4$ as a second unit and an optical IF $220_4$ corresponds to the processing system D.

The decoder 30 decodes a compressed ultra-high-resolution material video (or a compressed material video). The decoder 30 writes the decoded material video in the renderer 20 using RDMA.

The decoder 30 herein includes two units of CPUs 300 and an optical IF 310. Note that hardware configurations of the CPU 300 and the optical IF 310 are similar to those of the CPU 100 and the optical IF 110, respectively, and description thereof is thus omitted hereafter.

In this embodiment, the decoders $30_1$, $30_2$ as a first and a second unit, respectively, correspond to the processing system A. The decoders $30_3$, $30_4$ as a third and a fourth unit, respectively, correspond to the processing system B. The decoders $30_5$, $30_6$ as a fifth and a sixth unit, respectively, correspond to the processing system C. And, the decoders $30_7$, $30_8$ as a seventh and an eighth unit, respectively, correspond to the processing system D.

The HDD 40 ($40_1$, $40_2$) is a storage device that stores therein a compressed material video. In this embodiment, the real-time editing system 1 stores two compressed streams constituting an 8K compressed material video in the HDDs $40_1$, $40_2$, respectively. In other words, the real-time editing system 1: spatially divides compressed material video into a right and a left half; stores the left half of the compressed material video in the HDD $40_1$; and stores the right half thereof in the HDD $40_2$.

The SDI display 50 displays an 8K60p ultra-high-resolution video or the like. In this embodiment, the SDI display 50 is a display such as FPD (Flat Panel Display) or CRT (Cathode Ray Tube), which can display an ultra-high-resolution video received from the controller 10.

The PC display 60 is a display such as FPD or CRT, which can display a preview video received from the controller 10.

As illustrated in FIG. 1, the real-time editing system 1 connects the controller 10, the renderer 20, and the decoder 30 via the optical ring communication network, which makes it possible to perform memory transfer between those devices using RDMA. In the processing system A: the optical IF 110 of controller 10 and the optical IF 210 of renderer $20_1$ are connected to each other; and the optical IF $220_1$ of renderer $20_1$ and the optical IF 310 of decoder $30_1$ are connected to each other, via fiber optic cable. Also, in the processing system A, the optical IF $220_1$ of renderer $20_1$ and the optical IF 310 of decoder $30_2$ are connected to each other; and the optical IF 310 of decoder $30_1$ and the optical IF 310 of decoder $30_2$ are connected to each other, via fiber optic cable.

[Edit Processing in Real-Time Editing System]

Figure 3:
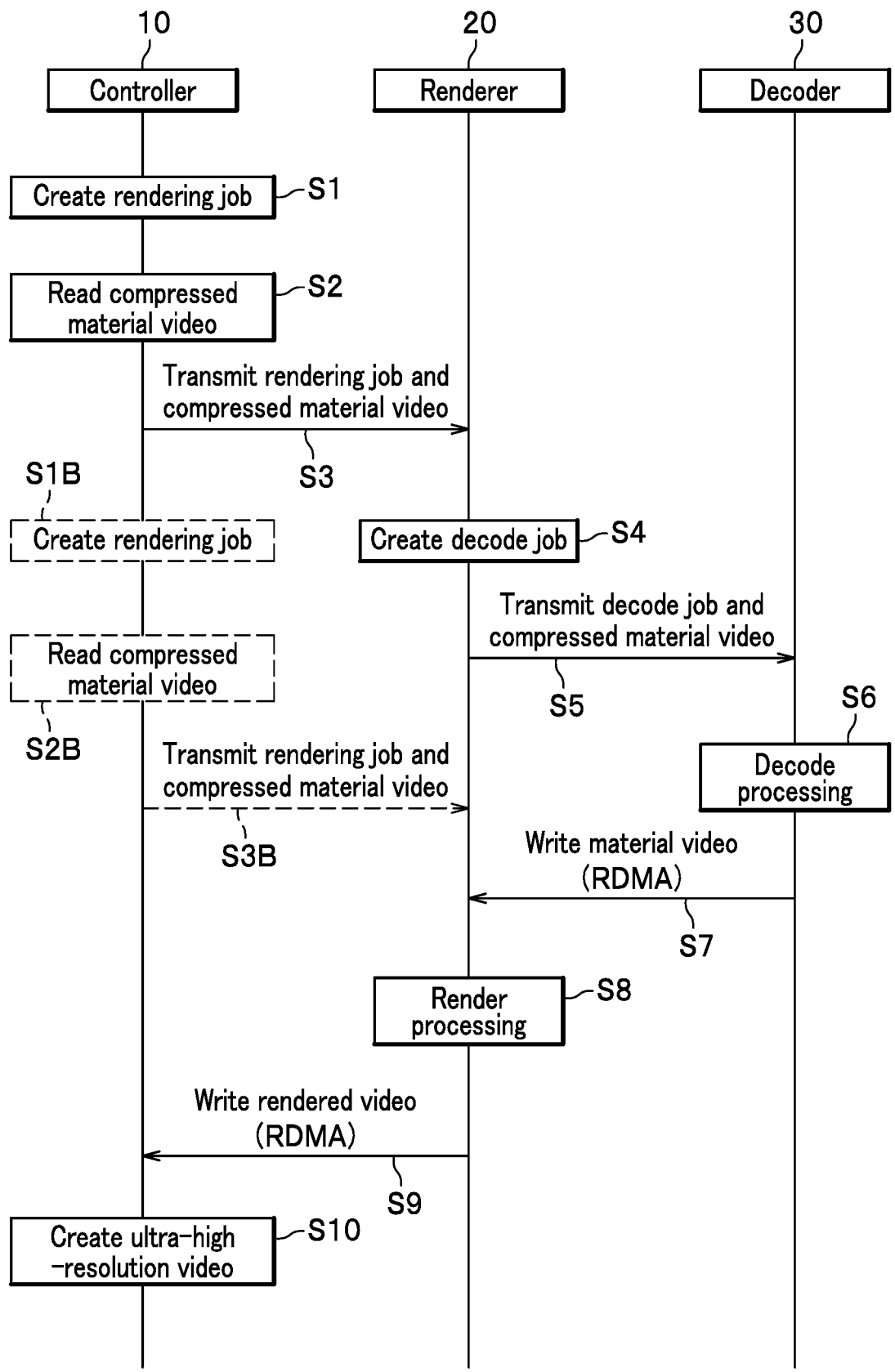
FIG. 3 is a sequence diagram illustrating an edit processing in the real-time editing system of FIG. 1 according to the embodiment.

An edit processing in the real-time editing system 1 is described with reference to FIG. 3 (see also FIG. 1 where appropriate).

As a start, a user of the real-time editing system 1 (an editor) operates input means such as a keyboard, a mouse, sliders, or the like not illustrated and sets information of various types necessary for an editing task, to the controller 10. The information of various types includes, for example, a type of a render processing performed by the renderer 20, a file name of a compressed material video which is inputted for a decode processing performed by the decoder 30, and contents of a processing.

With respect to the processing system A, the controller 10: creates a rendering job based on the information set by the user (step S1); and reads the compressed material video from the HDD 40 (step S2). Herein, the controller 10 previously reserves a buffer area into which the renderer 20 is to write a rendered video using RDMA; and adds identification information for identifying the reserved buffer area to the rendering job.

The controller 10 then transmits the created rendering job and the read compressed material video to the renderer 20 (step S3). The rendering job contains a render command to the renderer 20 and a decode command to the decoder 30.

The renderer 20: extracts the decode command in the rendering job received from the controller 10; and thereby creates a decode job (step S4). Herein, the renderer 20: previously reserves a buffer area into which the decoder 30 is to write a decoded material video using RDMA; and adds identification information for identifying the reserved buffer area to the decode job.

The renderer 20 then transmits the created decode job and the compressed material video received from the controller 10, to the decoder 30 (step S5).

The decoder 30 decodes the material video, based on the decode job received from the controller 10 (step S6).

The decoder 30 then writes the decoded material video into the buffer area in the renderer 20 specified by the decode job, using RDMA (step S7).

The renderer 20: renders the material video written in the buffer area, based on the rendering job; and thereby creates a rendered video (step S8).

The renderer 20 writes the created rendered video into the buffer area in the controller 10 specified by the rendering job, using RDMA (step S9).

The processing performed in steps S1 to S9 described above corresponds to that performed in the processing system A. In each of the processing systems B to D, same processings are performed in parallel. For example, in the processing system B, the controller 10 also: creates a rendering job (step S1B); reads a compressed material video (step S2B); and transmits the created rendering job (step S3B).

Note that for simple and easy viewing of the figure, illustration of another processings performed in the processing systems B to D is omitted hereafter.

The controller 10 then outputs the rendered videos written in the buffer 121 in order corresponding to the processing systems A to D, that is, in order of frame numbers, to thereby create a stream of an ultra-high-resolution video (step S10).

[Configuration of Controller]

A configuration of controller 10 is described with reference to FIG. 4 (see also FIG. 1 where appropriate).

Figure 4:
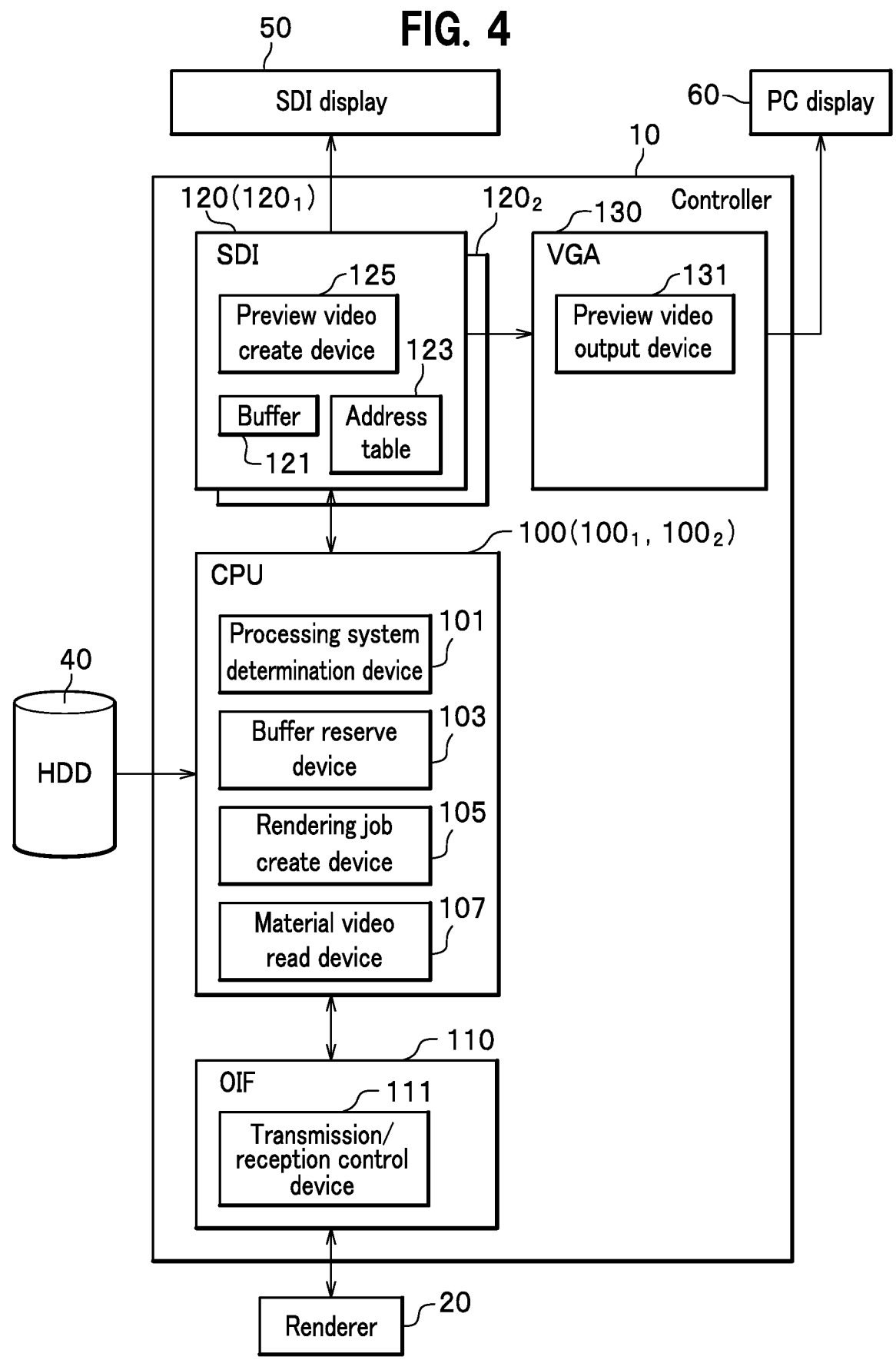
FIG. 4 is a block diagram illustrating a configuration of a controller of FIG. 1 according to the embodiment.

As illustrated in FIG. 4, the CPU 100 of controller 10 includes: a processing system determination device 101; a buffer reserve device (a first buffer reserve device) 103; a rendering job create device 105; and a material video read device 107.

Note that in FIG. 4, two units of the CPU $100_1$ and the CPU $100_2$ are collectively illustrated as one unit of the CPU 100.

The processing system determination device 101 determines which processing system sequentially processes which frame image of an ultra-high-resolution video. The processing system determination device 101 determines the processing system in accordance with a preset rule.

In this embodiment, the processing system determination device 101 allocates each of frames from the first to the last frame of an ultra-high-resolution video, to one of the processing systems A to D in turns. More specifically, when there are 60 frame images included in one second, the processing system determination device 101 determines that: the processing system A processes frames with frame numbers (0), (4), . . . , (56); the processing system B, frame numbers (1), (5), . . . , (57); the processing system C, frame numbers (2), (6), . . . , (58); and the processing system D, frame numbers (3), (7), . . . , (59).

The processing system determination device 101 arranges the rendered video written in the buffer 121 in order corresponding to that performed in the processing systems A to D, that is, in order of the frame numbers, to thereby create an ultra-high-resolution video.

The buffer reserve device 103 reserves a buffer area (a first buffer area) in which the rendered video received from the renderer 20 is stored, in the buffer 121 of SDI 120. The buffer reserve device 103 can reserve such a buffer area using any appropriate technique. In this embodiment, the buffer reserve device 103 is configured to reference an address table 123 and reserve a buffer area from a head side of the buffer 121.

How to reserve such a buffer area will be described in detail hereinafter.

The rendering job create device 105 creates a rendering job which contains a render command and a decode command, for each of frame images of an ultra-high-resolution video. The render command used herein instructs the renderer 20 to render a decoded material video. The decode command used herein instructs the decoder 30 to decode a compressed material video.

The rendering job create device 105: determines which one of the two decoders 30 decodes a material video, because each of the processing systems A to D includes two units of the decoders 30; and creates a decode command based on the determination.

In this embodiment, the rendering job create device 105 determines appropriate processing distribution such that processing load is equally distributed between the two decoders 30.

When, for example, two material videos are rendered, the rendering job create device 105 equally distributes decoding of the material videos between the two decoders 30.

It is assumed herein, for example, that three material videos each having frames with frame numbers (0), (1), (2), and (3) are rendered. The rendering job create device 105 distributes the frames for each of the material videos A, B, C, between the two decoders 30 as shown below. In this case, when leveled off over time, decoding of the material videos is equally distributed between the two decoders 30.

A first unit of the decoder 30: A(0), C(0), B(1), A(2), C(2), and B(3)

A second unit of the decoder 30: B(0), A(1), C(1), B(2), A(3), and C(3)

The rendering job create device 105 adds identification information (node number) on a node corresponding to the processing system determined by the processing system determination device 101, to a rendering job. The node used herein is identification information for identifying the CPU 200 of renderer 20. The two CPUs 200 included in the renderer 20 can be identified by the node numbers, such as node number 1 and node number 2. Referencing the node number of a rendering job makes it possible to specify which rendering job is executed in which processing system, because each of the processing systems is statically connected via the optical ring communication network.

The rendering job create device 105 stores the compressed material video read by the material video read device 107, in 'src-data' in the rendering job. The rendering job create device 105 then transmits the created rendering job to the renderer 20 via the optical IF 110.

Specific examples of the rendering job will be described later.

The material video read device 107 reads out a compressed material video stored in the HDD 40. In this embodiment, the material video read device 107 reads out a frame image sequence of the compressed material video stored in the 'src-data' in the rendering job, from the HDD 40. At this time, the material video read device 107 individually reads out the compressed material videos having been spatially divided into the two units of the HDD 40.

The optical IF 110 of controller 10 includes a transmission/reception control device 111.

The transmission/reception control device 111 controls transmission and reception of data to and from the renderer 20. The transmission/reception control device 111 performs a transmission control processing in which a rendering job is transmitted to the renderer 20 and a reception control processing in which a rendered video is received from the renderer 20.

Note that details of the transmission control processing and the reception control processing will be described hereinafter.

The transmission/reception control device 111 also performs an error handling so as to handle a packet loss or the like. As described above, the real-time editing system 1 has therein the optical ring communication network. Thus, when a transmitted packet goes around the optical ring communication network and comes full circle, the transmission is completed.

The transmission/reception control device 111: then compares a CRC (Cyclic Redundancy Code) of the transmitted packet with that of the returned packet; and, if the CRCs of the two packets are different from each other, determines that a data error has occurred.

In this embodiment, because a packet is transmitted without buffering, packet overtaking does not occur. Thus, when one packet goes around the optical ring communication network and is returned to an original point, if there is another packet which has been transmitted before the former, has not yet returned, the transmission/reception control device 111 determines that a loss of the latter packet has occurred.

When a data error or a packet loss has occurred, the transmission/reception control device 111 sets a retransmission flag; re-transmits the not-yet-returned packet; and, if such an error has occurred a plurality of times, notifies the user of the error.

The SDI 120 of controller 10 includes a buffer 121, an address table 123, and a preview video create device 125.

The buffer 121 is a buffer memory that stores therein a rendered video received from the renderer 20. The buffer 121: is a ring buffer that can store therein a plurality of pieces (for example, 64 pieces) of frame data: and can specify a ring buffer using a buffer number to be described hereinafter.

The address table 123 is a table that manages a buffer area in the buffer 121.

The preview video create device 125 creates a preview video at a resolution lower than that of an ultra-high-resolution video. For example, the preview video create device 125 creates a preview video at a resolution of 2K (1920×1080 pixels). The preview video create device 125 then outputs the created preview video to the VGA 130.

The VGA 130 of controller 10 includes a preview video output device 131. The preview video output device 131 outputs a preview video received from the preview video create device 125 to the PC display 60.

[Configuration of Synthesizer]

A configuration of the renderer 20 is described with reference to FIG. 5 (see also FIG. 1 where appropriate).

Figure 5:
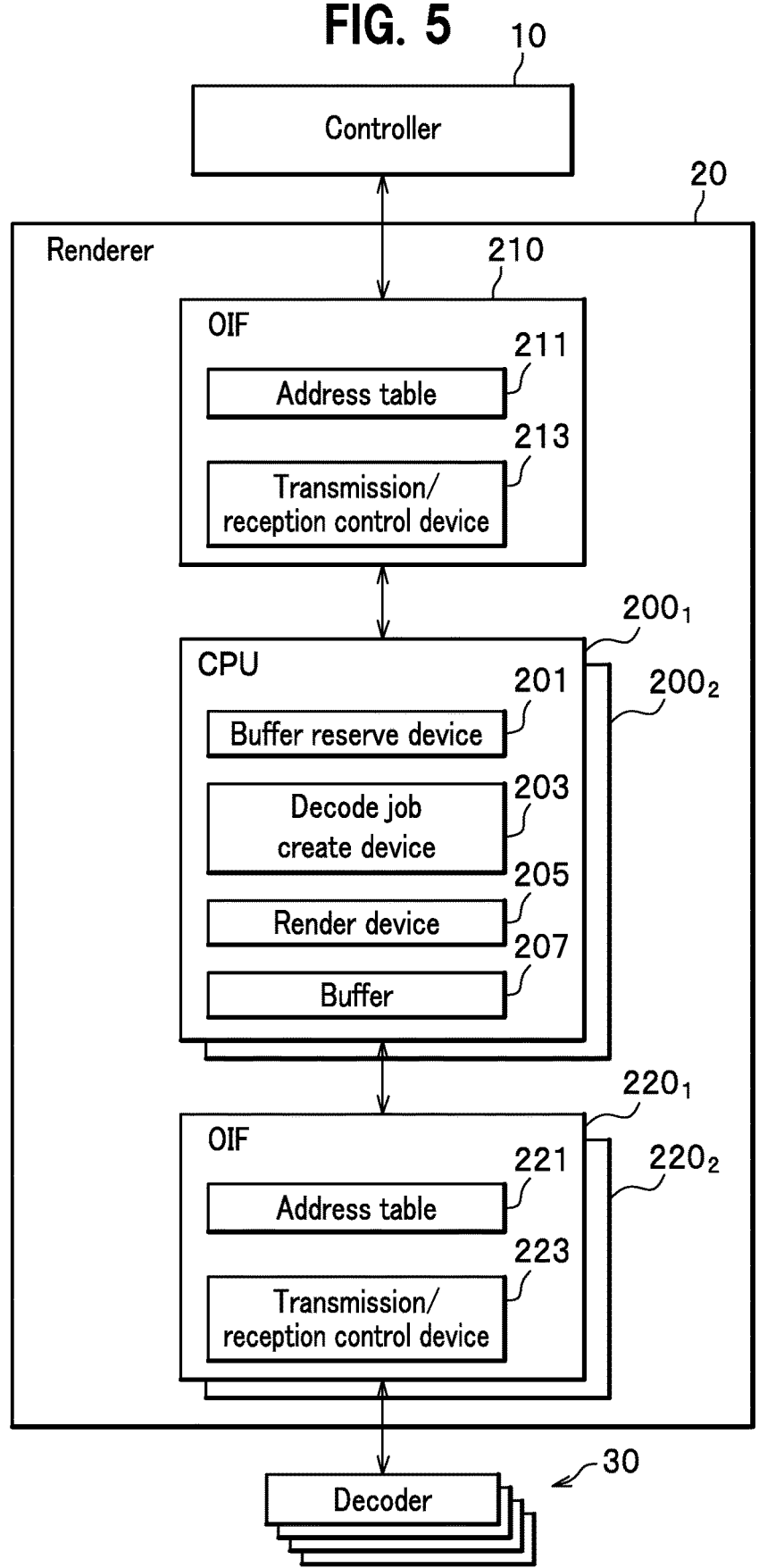
FIG. 5 is a block diagram illustrating a configuration of a renderer of FIG. 1 according to the embodiment.

As illustrated in FIG. 5, the CPU 200 of renderer 20 includes a buffer reserve device (a second buffer reserve device) 201, a decode job create device 203, a render device 205, and a buffer 207.

The buffer reserve device 201 previously reserves a buffer area (a second buffer area) which stores therein a material video received from the decoder 30, in the buffer 207 of CPU 200. In this embodiment, the buffer reserve device 201 reserves a buffer area in the buffer 207, using a technique similar to that of the buffer reserve device 103.

The decode job create device 203 creates a decode job containing a decode command of a rendering job received from the controller 10. That is, the decode job create device 203 extracts a decode command of a rendering job and thereby creates a decode job.

The decode job create device 203 describes identification information for identifying a buffer area reserved by the buffer reserve device 201, in the decode job. The decode job create device 203 transmits the created decode job and the compressed material video received from the controller 10 to the decoder 30 via the optical IF 220.

The render device 205 renders material videos decoded by the decoder 30, based on the rendering job received from the controller 10, to thereby create an ultra-high-resolution rendered video. For example, the render device 205 performs a render processing such as dissolve and wipe to the material video received from the decoder 30. The render device 205 then writes the created rendered video into a buffer area of the controller 10 specified by the rendering job, via the optical IF 210 using RDMA. Thus, the renderer 20 can directly write the rendered video into the buffer 121 of controller 10 without using an intermediate buffer.

The buffer 207 is a buffer memory that stores therein a material video received from the decoder 30.

The optical IF 210 of renderer 20 includes an address table 211 and a transmission/reception control device 213.

The address table 211 is a table that manages a buffer area in the buffer 207.

The transmission/reception control device 213 controls transmission and reception of data to and from the controller 10. The transmission/reception control device 213 performs a transmission control processing in which a rendered video is transmitted to the controller 10 and a reception control processing in which a rendering job is received from the controller 10.

Note that the transmission/reception control device 213 also performs a transmission control processing, a reception control processing, and an error handling, similar to those performed by the transmission/reception control device 111, and further description thereof is thus omitted hereafter.

The optical IF 220 of renderer 20 includes an address table 221 and a transmission/reception control device 223.

The address table 221 is a table that manages a buffer area in the buffer 207.

The transmission/reception control device 223 controls transmission and reception of data to and from the decoder 30. The transmission/reception control device 223 performs a transmission control processing in which a decode job is transmitted to the decoder 30 and a reception control processing in which a material video is received from the decoder 30.

Note that the transmission/reception control device 223 also performs a transmission control processing and a reception control processing, similar to those performed by the transmission/reception control device 111, and further description thereof is thus omitted hereafter.

[Configuration of Decoder]

A configuration of the decoder 30 is described with reference to FIG. 6 (also see FIG. 1 where appropriate).

As illustrated in FIG. 6, the CPU 300 of decoder 30 includes a buffer reserve device 301, a decoding device 303, and a buffer 305.

The buffer reserve device 301 reserves a buffer area in the buffer 305.

The decoding device 303 decodes a compressed material video, based on a decode job received from the renderer 20. The decoding device 303 performs a decode processing having contents specified by a decode job, to a compressed material video contained in the decode job. The decoding device 303 then writes the decoded material video into a buffer area of the renderer 20 specified by the decode job, via the optical IF 310 using RDMA. Thus, the decoder 30 can directly write the material video into the buffer 207 of renderer 20 without using an intermediate buffer.

The buffer 305 is a buffer memory.

In this embodiment, the decoder 30 includes two units of the CPU 300, which means that there are two units of the decoding devices 303. Thus, in the decoder 30, each of the two units of the CPU 300 decodes a spatially-divided compressed material video. For example, a decoding device $303_1$ decodes a left half of the compressed material video, and a decoding device $303_2$, a right half thereof. In this case, the decoding device 303 combines the decoded right and left halves of the material video, and thereby creates a single material video.

The optical IF 310 of decoder 30 includes an address table 311 and a transmission/reception control device 313.

The address table 311 is a table that manages a buffer area in the buffer 305.

The transmission/reception control device 313 controls transmission and reception of data to and from the renderer 20. The transmission/reception control device 313 performs a transmission control processing in which a material video is transmitted to the renderer 20, and a reception control processing in which a decode job is received from the renderer 20.

Note that the transmission/reception control device 313 also performs a transmission control processing, a reception control processing, and an error handling similar to those performed by the transmission/reception control device 111, and further description thereof is thus omitted hereafter.

<Specific Example of Rendering Job>

A specific example of a rendering job which is created by the rendering job create device 105 is described with reference to FIG. 7 (also see FIG. 1 and FIG. 3 where appropriate).

Figure 7A:
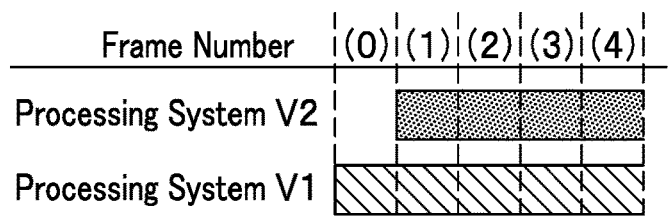
FIG. 7 is an explanatory diagram illustrating a rendering job created by a rendering job create device of FIG. 4 according to the embodiment.

As illustrated in FIG. 7A, the real-time editing system 1 is assumed to decode and render two compressed material videos V1, V2. More specifically, the real-time editing system 1: decodes the compressed material video V1 at a frame with frame number (0); and decodes and renders the compressed material videos V1, V2 at frames (1) to (4).

Figure 7B:
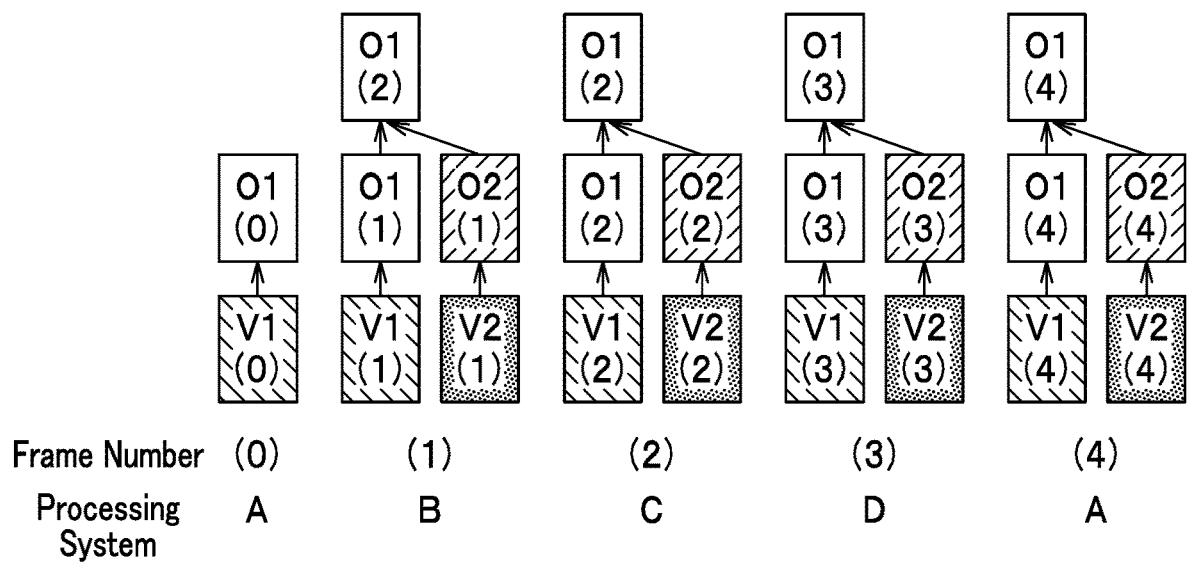

The processing system determination device 101 first determines the processing system for each of the frames with the numbers (0) to (4), as illustrated in FIG. 7B. In this embodiment, the processing systems A to D are configured to alternately perform respective processings every four-frame interval. Thus, the processing system A processes frames (0) and (4); the processing system B, frame (1); the processing system C, frame (2); and the processing system D, frame (3).

Figure 7C:
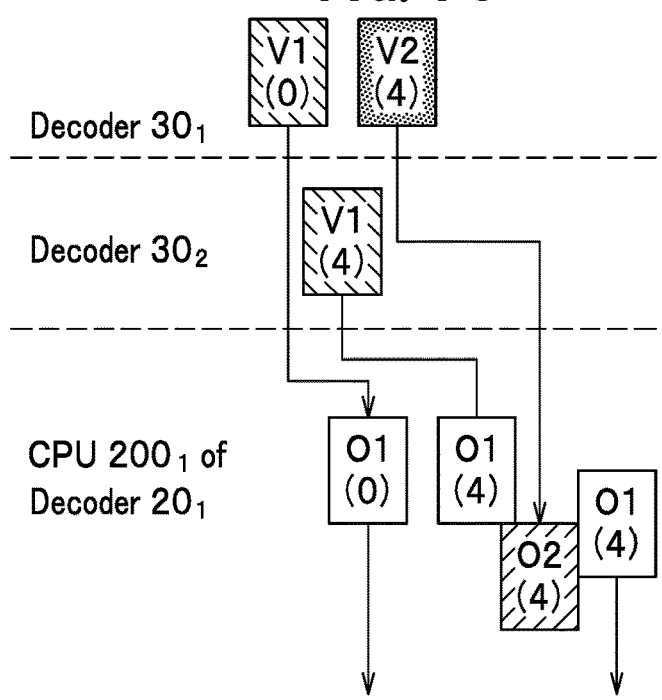

Note that in FIGS. 7B and 7C, let O1, O2 be the videos V1, V2 after being decoded, respectively. Numerical values in parentheses put after V1, V2, O1, and O2 are the frame numbers.

Description below is made focusing on the processing system A. As illustrated in FIG. 7C, at frame (0), the decoder $30_1$ as the first unit decodes a compressed material video V1 (0) into a material video O1 (0), and outputs the material video O1 (0) as a rendered video without any change. Then, the rendering job create device 105: creates a rendering job containing an appropriate decode command and an appropriate render command; and adds a node number indicating the CPU $200_1$ as the first unit of the renderer $20_1$ (for example, 'node number 1') to the rendering job.

Note that at frame (0), the compressed material video V2 to be decoded by the decoder $30_2$ as the second unit is not present. The rendering job does not therefore contain a decode command to the decoder $30_2$.

At frame (4), the decoder $30_2$ as the second unit decodes a compressed material video V1 (4) into a material video O1 (4), and the decoder $30_1$ as the first unit decodes a compressed material video V2 (4) into a material video O2 (4). The CPU $200_1$ of renderer $20_1$ renders the material video O1 (4) and the material video O2 (4) and outputs a rendered video O1 (4). Then, the rendering job create device 105: creates a rendering job containing an appropriate decode command and an appropriate render command; and adds a node number indicating the CPU $200_1$ as the first unit of the renderer $20_1$ to the rendering job.

The rendering job can be described as below, using BNF (Backus-Naur Form). In the rendering job used herein, a line of 'render' shows a render command, and a line of 'decode' shows a decode command. Note that the description above indicates a data type, and an actual rendering job is created as binary data in which the type is structured.

```
<rendering-job>::=<render>{<decode>}
<render>::=<render-id><dst-id>{<src-id>}<render-param>
<decode>::=<decode-id><dst-id><src-data>
<dst-id>::=<frame-id>
<str-id>::=<frame-id>
<frame-id>::=<frame-number><buffer-number>
```

A render_command of a rendering job contains parameters as follows.

'render-id' (id: identification) is identification information set for each type of render processings such as dissolve and wipe.

'dst-id' is identification information for identifying a buffer area in the controller 10 in which a rendered video is stored and has a notation same as a type of 'frame-id'.

'src-id' is identification information for identifying a frame image of a material video or a rendered video in a rendering job of interest and has a notation same as a type of 'frame-id'.

'render-param' is a processing parameter unique to each of render processings and can be freely set.

'frame-id' used herein represents a 64-bit value obtained by concatenation of 'frame-number' indicating a frame number and 'buffer-number' indicating a buffer number. That is, 'frame-id' can be represented by (frame number<<32)|buffer number. The frame number is concatenation of a frame number (a number indicating where a frame of interest is located counting from a start of playing) to be subjected to a render processing and a buffer number to be used in the render processing. Note that '|' represents a logical add (OR) of bit operation.

A decode command of a rendering job contains parameters as follows.

'decode-id' is identification (ID) information set for each of contents of a decode processing, such as a compression format and a bit rate.

'dst-id' is identification information for identifying a buffer area in the renderer 20 in which a material video is recorded.

'src-data' is a data string of a frame image to be subjected to a decode processing, in a compressed material video.

Note that 'dst-id' is set not when a rendering job is created but after the renderer 20 reserves a buffer area.

At frame (4), a render command and a decode command of the rendering job are as follows.

```
render-id='dissolve',dst-id=(4<<32)|1,src-id[0]=(4<<32)|1,src-id[1]=(4<<32)|2
decode-id='8K-decode',dst-id=(4<<32)|1,src-data=V2 (4)
decode-id='8K-decode',dst-id=(4<<32)|2,src-dataV1(4)
```

A render command is described in one line in the above rendering job.

render-id='dissolve' shows that a type of the render processing is dissolve. 'dst-id' and 'src-id' show that two units of buffers with buffer numbers '01', '02' are used at frame (4).

A decode command corresponding to the decoders $30_1$, $30_2$ is described in two lines in the above rendering job.

decode-id='8K-decode' shows that a resolution of a decode processing of interest is 8K. src-data=V2 (4) in the decode command in the first line shows a data string of a frame image with frame number (4) contained in the compressed material video V2. src-data=V1(4) in the decode command in the second line shows a data string of a frame image with frame number (4) contained in the compressed material video V1.

<Write using RDMA>

How a buffer area is reserved is described below with reference to FIG. 8 (also see FIG. 1, FIG. 4, and FIG. 5 where appropriate).

Description herein is made assuming that the renderer 20 of FIG. 1 writes a rendered video in the buffer 121 of controller 10. That is, the renderer 20 serves as a transmitter, and the controller 10 serves as a receiver.

It is also assumed herein that a rendered video to be written is previously stored in the buffer 207 of renderer 20. At this time, M pieces of frame images of the rendered video are assumed to be divided into N pieces of slices (M and N are each an integer greater than or equal to 2) and to be stored by the slice. For convenience of description, a size of the slice is assumed to be 256 (0×100) bytes.

Figure 8:
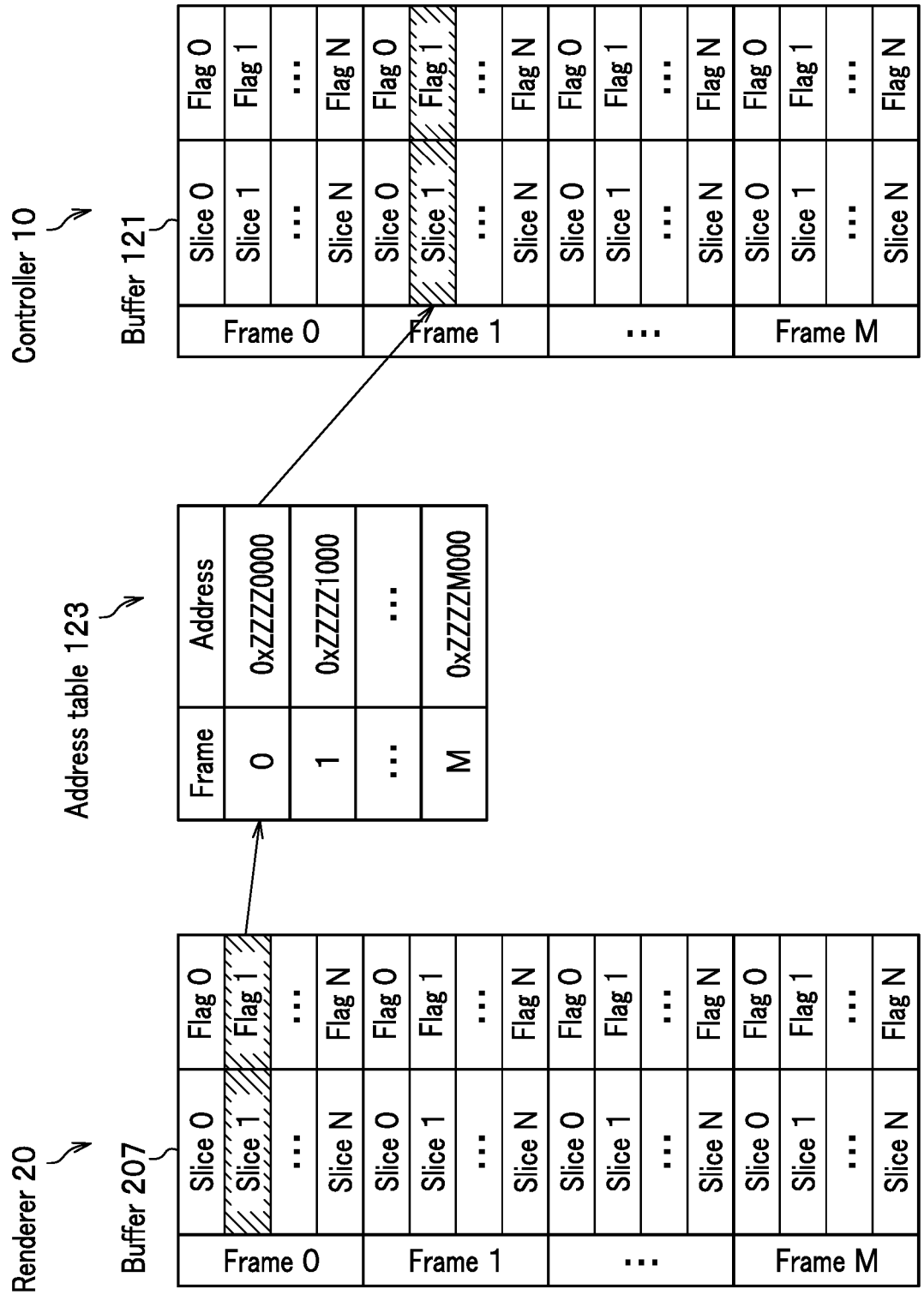
FIG. 8 is an explanatory diagram illustrating a write using RDMA in the real-time editing system of FIG. 1 according to the embodiment.

As illustrated in FIG. 8, the buffer reserve device 103 of controller 10: references the address table 123; and reserves a necessary buffer area counting from a head side of the buffer 121. At this time, the buffer reserve device 103 specifies the buffer area by a buffer number, an offset, and a size.

The buffer number used herein is identification information for identifying a buffer in which a rendered video or a material video is stored.

The offset used herein is the number of bytes from the head of the buffer 121 to a head of a slice to be transferred.

The size used herein is a size of a slice.

A case is assumed, for example, in which slice 1 of frame 0 stored in the buffer 207 is written into slice 1 of frame 1 in the buffer 121. Referring to the address table 123, an address of frame 1 in the buffer 121 is '0xZZZZ1000'. Further, as the size of a slice of interest is '0x100' and slice 1 is a target for writing, the offset is '0x100'. The buffer reserve device 103 thus: reserves a buffer area specified by the buffer number, the offset, and the size, in the buffer 121; and sets a flag indicating that the specified buffer area has already been reserved, in the buffer 121. The flag is information showing whether each of the slices in the buffer 121 has already been reserved. The rendering job create device 105 then adds identification information for identifying the buffer area of interest to a rendering job.

The transmission/reception control device 213 of renderer 20: creates a header packet from the identification information on the buffer area having been added to the received rendering job; and creates a data packet from the rendered video stored in the buffer 207. The transmission/reception control device 213 then transmits the created header packet and data packet to the controller 10.

Note that creation and transmission of a header packet and a data packet will be further explained when a transmission control processing is described hereinafter.

The transmission/reception control device 111 of controller 10 receives the header packet and the data packet from the renderer 20. The transmission/reception control device 111 writes the data packet into a buffer area in the buffer 121 specified by the received header packet.

Note that writing of a data packet will be further explained when a reception control processing is described hereinafter.

<Transmission Control Processing>

Figure 9:
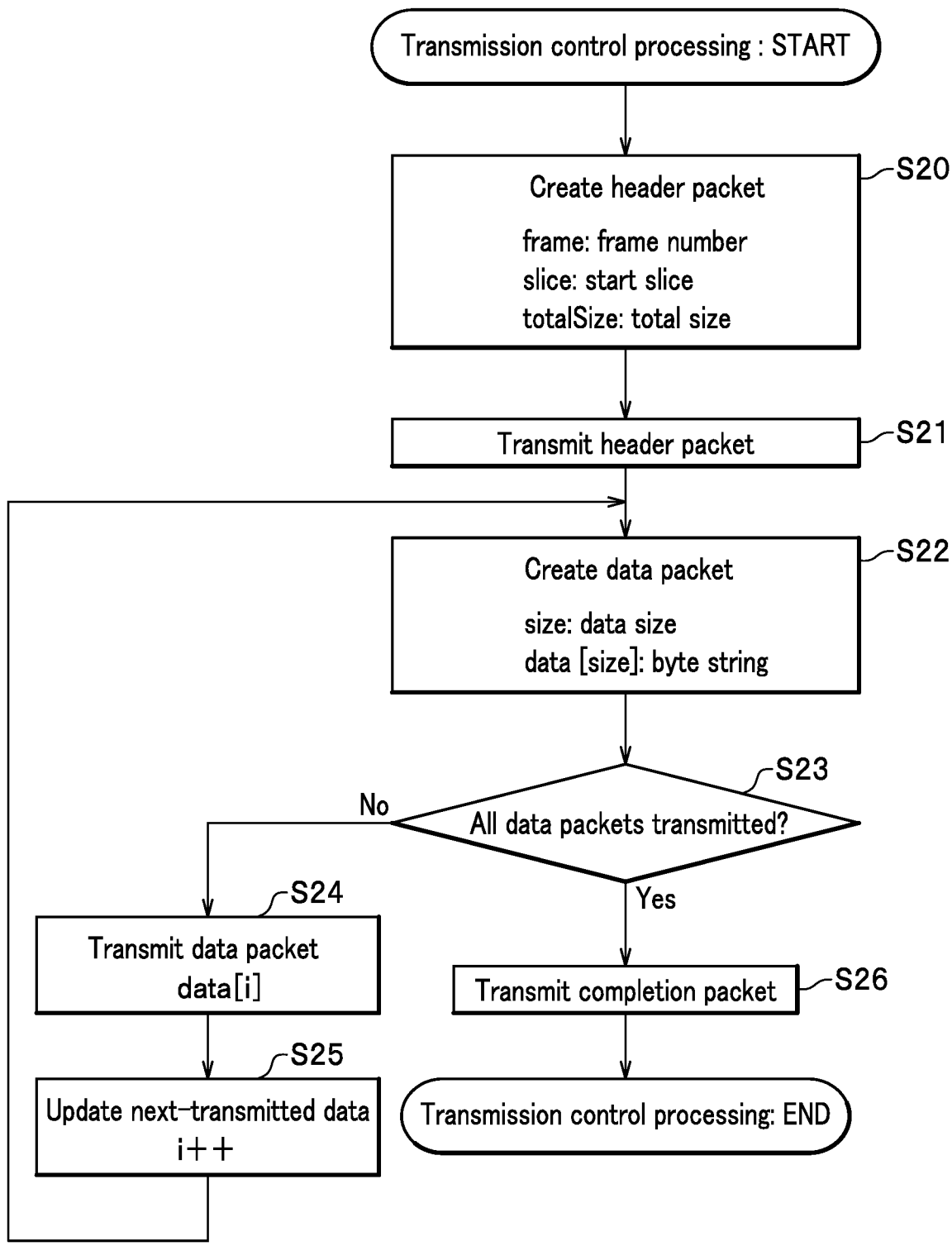
FIG. 9 is a flowchart of a transmission control processing in the real-time editing system of FIG. 1 according to the embodiment.

A transmission control processing is described with reference to FIG. 9 (also see FIG. 4 where appropriate).

Description herein is made assuming that the transmission/reception control device 213 of renderer 20 performs a transmission control processing.

The transmission/reception control device 213 creates a header packet (step S20), and transmits the created header packet to the controller 10 (step S21).

The header packet contains, as parameters, a transmitting source unit ID, a destination unit ID, a packet ID, a frame number (frame), a start slice (slice), and a total size (totalSize).

The unit used herein means the controller 10, the renderer 20, or the decoder 30.

The transmitting source unit ID: indicates identification information for identifying a unit that transmits a packet; and is, for example, a previously-allocated unique numerical value.

The destination unit ID: indicates identification information for identifying a unit that receives a packet; and is herein a unique numerical value previously-allocated to the controller 10.

The packet ID is identification information for identifying each of packets (for example, a serial number).

The frame number indicates a frame number (FIG. 8) previously allocated in the buffer 121 of controller 10, and can be obtained based on identification information for identifying a buffer area added to a rendering job.

The start slice indicates a slice number (FIG. 8) previously allocated in the buffer 121 of controller 10, and can be obtained based on identification information for identifying a buffer area added to a rendering job.

The total size indicates a size of data transmitted at a time, that is, a size of a slice.

The transmission/reception control device 213 creates a data packet (step S22).

The data packet contains, as data contents, a data size (size) and a byte string (data[size]).

The data size indicates a size of data in a single packet.

The byte string indicates contents of a data packet. The byte string is acquired from the buffer 207 using DMA (Direct Memory Access).

The transmission/reception control device 213 determines whether or not all data packets have already been transmitted to the controller 10 (step S23). That is, the transmission/reception control device 213 determines whether or not the data packets of a size corresponding to a total transmission size thereof have already been transmitted.

If all the data packets have not yet been transmitted (if No in step S23), the transmission/reception control device 213: transmits an i-th data packet to the controller 10 (step S24); updates a data packet to be transmitted next time (step S25); and returns to step S22.

Note that "i" is returned to default (i=0) before or in step S21.

If all of the data packets have already been transmitted (if Yes in step S23), the transmission/reception control device 213: transmits a completion packet to the controller 10 (step S26); and terminates the transmission control processing.

<Reception Control Processing>

Figure 10:
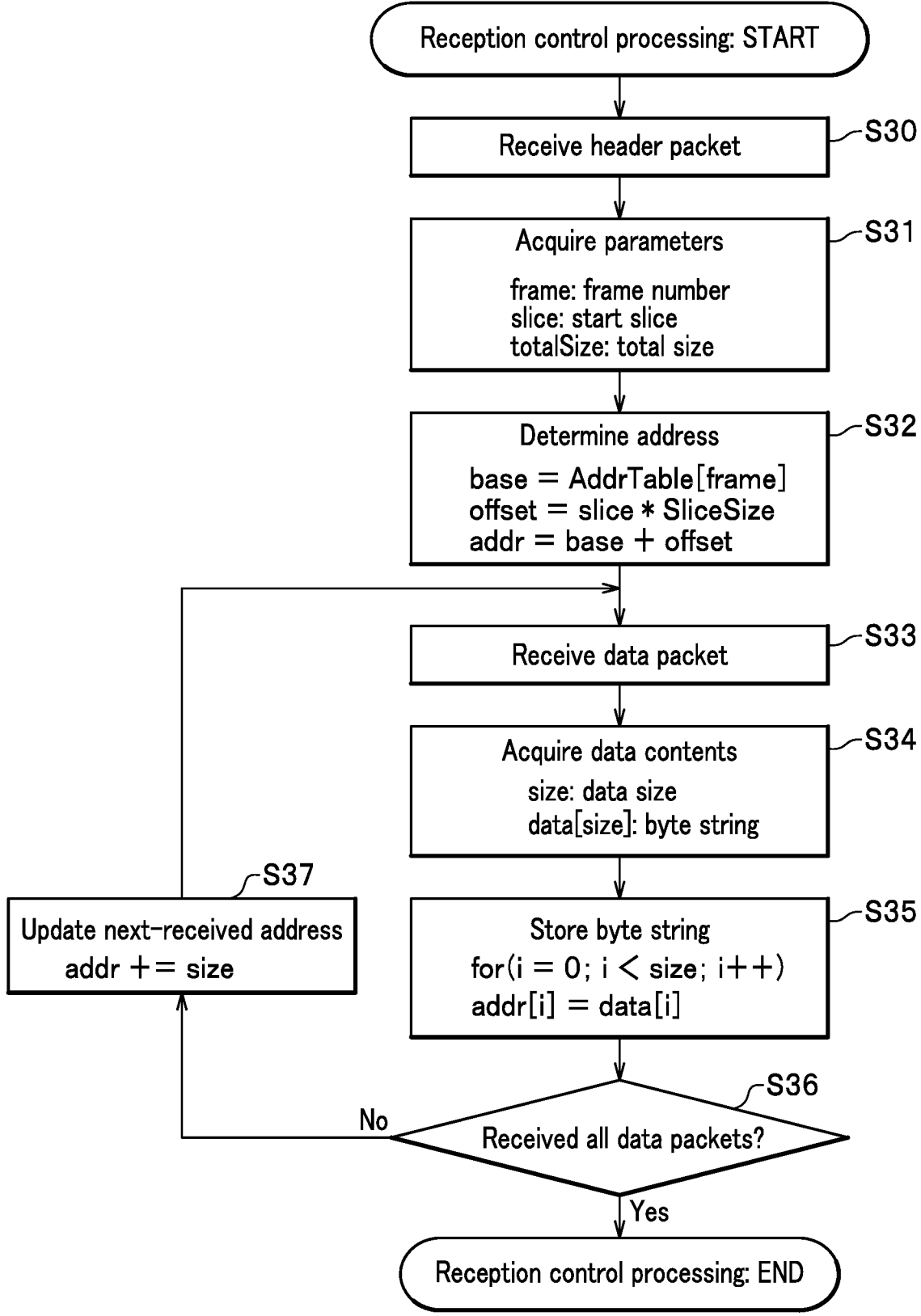
FIG. 10 is a flowchart of a reception control processing in the real-time editing system of FIG. 1 according to the embodiment.

A reception control processing is described with reference to FIG. 10 (also see FIG. 5 where appropriate).

Description herein is made assuming that the transmission/reception control device 111 of controller 10 performs a reception control processing.

The transmission/reception control device 111 receives a header packet from the controller 10 (step S30).

The transmission/reception control device 111 acquires a parameter from the received header packet (step S31). More specifically, the transmission/reception control device 111 receives, as parameters, a frame number (frame), a start slice (slice), and a total size (totalSize) from the header packet.

The buffer reserve device 103 determines an address of the buffer 121 in which the data packet is stored, using the parameters acquired from the header packet (step S32). More specifically, the buffer reserve device 103: reserves a buffer area in a size corresponding to the total size, in the buffer 121, based on an address indicated by the frame number and the start slice; and determines the address of the buffer 121. The buffer reserve device 103 stores the address of the buffer 121 in an array (AddrTable[frame]), in the address table 123.

The transmission/reception control device 111 receives a data packet (step S33).

The transmission/reception control device 111 acquires data contents from the data packet (step S34). More specifically, the transmission/reception control device 111 acquires, as the data contents, a data size (size) and a byte string (data[size]).

The transmission/reception control device 111 stores the acquired byte string in the buffer 121 (step S35). More specifically, the transmission/reception control device 111 stores the byte string in the address of the buffer 121 determined in step S32.

The transmission/reception control device 111 determines whether or not all data packets have already been received from the renderer 20 (step S36). That is, the transmission/reception control device 111 determines whether or not a completion packet has already been received.

If all of the data packets have not yet been received (if No in step S36), the transmission/reception control device 111 updates an address to be received next time (step S37), and returns to step S13.

If all of the data packets have already been received, (if Yes in step S36), the transmission/reception control device 111 terminates the reception control processing.

Note that description described above of the transmission control processing, the reception control processing, and the error handling has been made assuming an example in which the renderer 20 transmits a rendered video to the controller 10. When the decoder 30 transmits a material video to the renderer 20, description is similar and is thus omitted hereafter.

Also, when the controller 10 transmits a rendering job to the renderer 20 and when the renderer 20 transmits a decode job to the decoder 30, description is similar and is thus omitted hereafter.

[Operations and Advantageous Effects]

The real-time editing system 1 according to the embodiment of the present invention has a throughput increased by processing division, time division, and space division and can thus perform editing of even an ultra-high-resolution video with an enormous amount of data on a real time basis.

Further, the real-time editing system 1 has therein an optical ring communication network and performs a write using RDMA. This makes it possible to perform video editing in real time without using intermediate buffer.

The real-time editing system 1 can efficiently perform a real-time editing, because a user can check a preview video on the PC display 60.

The embodiment of the present invention has been explained as aforementioned. The present invention is not, however, limited to the above-described embodiment, and design change or the like is also possible within a scope not departing from the gist of the present invention.

In the embodiment described above, description has been made assuming that in the real-time editing system 1, an ultra-high-resolution video is at 8K60p. A resolution or a frame rate of the ultra-high-resolution video is not, however, limited to this.

In the embodiment described above, description has been made assuming that the real-time editing system 1 outputs an ultra-high-resolution video to the SDI display 50. The present invention is not, however, limited to this. For example, the real-time editing system 1 may output an ultra-high-resolution video to a video recording apparatus (not illustrated).

In the embodiment described above, description has been made assuming that the real-time editing system 1 uses an optical ring communication network, but may use a packet communication network other than the optical ring communication network.

In the embodiment described above, description has been made assuming that the real-time editing system 1 has four processing systems. The present invention is not, however, limited to this. Further, the real-time editing system 1 may be equipped with any number of units of the renderers 20 or the decoders 30 included in each of the processing systems. The number of units of CPUs included therein can also be freely selected.

DESCRIPTION OF REFERENCE NUMERALS 1 real-time editing system
10 controller
20, $20_1$, $20_2$ renderer
30, $30_1$-$30_8$ decoder
40 HDD
50 SDI display
60 PC display
100, $100_1$, $100_2$ CPU
101 processing system determination device
103 buffer reserve device (first buffer reserve device)
105 rendering job create device
107 material video read device
110 optical IF
111 transmission/reception control device
120, $120_1$, $120_2$ SDI
121 buffer
123 address table
125 preview video create device
130 VGA
131 preview video create device
200, $200_1$-$200_4$ CPU
201 buffer reserve device (second buffer reserve device)
203 decode job create device
205 render device
207 buffer
210 optical IF
211 address table
213 transmission/reception control device
220, $220_1$-$220_4$ optical IF
221 address table
223 transmission/reception control device
300, $300_1$, $300_2$ CPU
301 buffer reserve device
303 decoding device
305 buffer
310 optical IF
311 address table
313 transmission/reception control device

The invention claimed is:

1. A real-time editing system of an ultra-high-resolution video, comprising:
a plurality of decoders, each of which is configured to decode a compressed ultra-high-resolution material video;
a plurality of renderers, each of which is configured to render the material video decoded by the decoder; and
a single unit of controller configured to control the decoder and the renderer,
wherein the controller includes
a processing system determination device configured to determine which processing system processes which frame image of the ultra-high-resolution video, the processing system being sequentially processing the frame images and
a rendering job create device configured to create, for each of the frame images, a rendering job containing a decode command which instructs the decoder to decode the compressed material video and a render command which instructs the renderer to render the decoded material video, and transmit the created rendering job to the renderer,
wherein the renderer includes
a decode job create device configured to create a decode job containing the decode command in the rendering job received from the controller, and transmit the created decode job to the decoder, and
a render device configured to render the material video decoded by the decoder, based on the rendering job received from the controller, and thereby create an ultra-high-resolution rendered video, the number of units of the render device being half that of the processing systems,
wherein the decoder includes a decoding device configured to decode the compressed material video, based on the decode job received from the renderer, and
wherein the processing system determination device of the controller is configured to create the ultra-high-resolution video in which the rendered video created by the renderer is arranged in order corresponding to the processing systems.

2. The real-time editing system according to claim 1,
wherein the controller, the renderers, and the decoders are connected to each other for each of the processing systems via a packet communication network,
wherein the controller further includes a first buffer reserve device configured to previously reserve a first buffer area for storing therein the rendered video in a buffer memory of the controller,
wherein, in the controller, the rendering job create device adds identification information for identifying the reserved first buffer area to the rendering job,
wherein the renderer further includes a second buffer reserve device configured to previously reserve a second buffer area for storing therein the material video in a buffer memory of the renderer,
wherein, in the renderer, the decode job create device adds identification information for identifying the reserved second buffer area to the decode job, wherein the decoding device of the decoder writes the decoded material video into the second buffer area via the optical ring communication network, based on the decode job, and wherein the render device of the renderer writes the created rendered video into the first buffer area via the optical ring communication network, based on the rendering job.

3. The real-time editing system according to claim 2, wherein the controller further includes:
- a preview video create device configured to create, from the ultra-high-resolution video, a preview video at a resolution lower than that of the ultra-high-resolution video; and
- a preview video output device configured to output the preview video created by the preview video create device.

\* \* \* \* \*